United States Patent
Godin et al.

(10) Patent No.: US 12,369,147 B2
(45) Date of Patent: Jul. 22, 2025

(54) CONFIGURED GRANT SMALL DATA TRANSMISSION RECONFIGURATION WITHOUT USER EQUIPMENT CONTEXT IN DISTRIBUTED UNIT

(71) Applicant: Nokia Technologies Oy, Espoo (FI)

(72) Inventors: Philippe Godin, Versailles (FR); Daniela Laselva, Klarup (DK); Subramanya Chandrashekar, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 527 days.

(21) Appl. No.: 18/045,347

(22) Filed: Oct. 10, 2022

(65) Prior Publication Data
US 2023/0125569 A1 Apr. 27, 2023

(30) Foreign Application Priority Data
Oct. 21, 2021 (IN) .............................. 202141047872

(51) Int. Cl.
*H04W 72/12* (2023.01)
*H04W 76/19* (2018.01)

(52) U.S. Cl.
CPC ........... *H04W 72/12* (2013.01); *H04W 76/19* (2018.02)

(58) Field of Classification Search
CPC combination set(s) only.
See application file for complete search history.

(56) References Cited

U.S. PATENT DOCUMENTS

| 2018/0270792 A1* | 9/2018 | Park .................... H04W 68/025 |
| 2020/0252842 A1 | 8/2020 | Hsieh et al. |
| 2021/0160946 A1 | 5/2021 | Oak et al. |

(Continued)

FOREIGN PATENT DOCUMENTS

| CN | 13727437 | * | 1/2021 | |
| WO | WO-2020227022 A2 | * | 11/2020 | ............ H04W 52/10 |
| WO | 2021/207317 A1 | | 10/2021 | |

OTHER PUBLICATIONS

NPL document, Introduction of SDT Elbonia, May 19-27, 2021 (Year: 2021).*

(Continued)

*Primary Examiner* — Mewale A Ambaye
(74) *Attorney, Agent, or Firm* — Nokia Technologies Oy (57) ABSTRACT

Systems, methods, apparatuses, and computer program products for configured grant small data transmission reconfiguration without user equipment context in a distributed unit are provided. For example, a method can include receiving, at a first network element, data in a transmission from a user equipment. The method can also include storing a first indication of a first configuration used by the user equipment to perform the transmission. The method can further include sending, to a second network element, a resume request to set up communication context for the data transmission. The method can additionally include receiving, from the second network element, a second indication of a second configuration previously allocated to the user equipment. The method can also include comparing the first indication and the second indication. The method can further include proceeding with setting up the communication of the data based on the comparing.

20 Claims, 8 Drawing Sheets

(56) References Cited

U.S. PATENT DOCUMENTS

2021/0315049 A1    10/2021  Wei et al.
2022/0086899 A1*    3/2022  Shih .................... H04L 5/0053
2023/0127160 A1*    4/2023  Khoshkholgh et al. ...................
                                                H04W 74/0836
                                                       370/329

OTHER PUBLICATIONS

"Work Item on NR smalldata transmissions in Inactive state", 3GPP TSG RAN Meeting #91e, RP-210870, Agenda: 9.1.2, ZTE Corporation, 2021, 5 pages.
"Support of CG based small data transmission", 3GPP TSG-RAN WG3 Meeting #111-e, R3-210140, Agenda: 8.1, Huawei, Jan. 25-Feb. 5, 2021, 2 pages.
"Introduction of SDT", 3GPP TSG-RAN WG2 Meeting #114 Electronic, R2-2108242, Nokia, May 19-27, 2021, 14 pages.
"Running MAC CR for Small Data", 3GPP TSG-RAN2 Meeting #115e, R2-2107494, Huawei, Aug. 9-27, 2021, 67 pages.
PCT Application No. PCT/EP2022/076239, "Method, Apparatus and Computer Program", filed on Sep. 21, 2022, pp. 1-57.
"(TP for NR_IAB BL CR TS 38.473): Miscellaneous stage 3 correction", 3GPP TSG-RAN WG3 Meeting #108-e, R3-204248, Agenda: 13.2.1.2, Huawei, Jun. 1-11, 2020, pp. 1-28.
"Summary of offline discussion on Small Data Transmission", 3GPP TSG-RAN WG3 #112-e, R3-212631, Agenda: 30, Ericsson, May 17-27, 2021, pp. 1-8.

* cited by examiner

CONFIGURED GRANT SMALL DATA TRANSMISSION RECONFIGURATION WITHOUT USER EQUIPMENT CONTEXT IN DISTRIBUTED UNIT

RELATED APPLICATION

This application claims priority to IN Provisional Application No. 202141047872 filed Oct. 21, 2021 which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing configured grant small data transmission reconfiguration without user equipment context in a distributed unit.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to perform receiving, at a first network element, data in a transmission from a user equipment. The at least one memory and computer program code can also be configured, with the at least one processor, to cause the apparatus at least to perform storing a first indication of a first configuration used by the user equipment to perform the transmission. The at least one memory and computer program code can further be configured, with the at least one processor, to cause the apparatus at least to perform sending, to a second network element, a resume request to set up communication context for the data transmission. The at least one memory and computer program code can additionally be configured, with the at least one processor, to cause the apparatus at least to perform receiving, from the second network element, a second indication of a second configuration previously allocated to the user equipment. The at least one memory and computer program code can also be configured, with the at least one processor, to cause the apparatus at least to perform comparing the first indication and the second indication. The at least one memory and computer program code can further be configured, with the at least one processor, to cause the apparatus at least to perform proceeding with setting up the communication of the data based on the comparing.

An embodiment may be directed to an apparatus. The apparatus can include at least one processor and at least one memory comprising computer program code. The at least one memory and computer program code can be configured, with the at least one processor, to cause the apparatus at least to perform storing, at a second network element, a second indication of a second configuration previously allocated to a user equipment. The at least one memory and computer program code can also be configured, with the at least one processor, to cause the apparatus at least to perform receiving, at the second network element from a first network element, a resume request to set up communication context for the data transmission from the user equipment. The at least one memory and computer program code can further be configured, with the at least one processor, to cause the apparatus at least to perform sending, from the second network element to the first network element, the stored second indication. The second indication can be configured to permit comparison at the first network element to a first indication of a first configuration in use by the user equipment.

An embodiment may be directed to a method. The method can include receiving, at a first network element, data in a transmission from a user equipment. The method can also include storing a first indication of a first configuration used by the user equipment to perform the transmission. The method can further include sending, to a second network element, a resume request to set up communication context for the data transmission. The method can additionally include receiving, from the second network element, a second indication of a second configuration previously allocated to the user equipment. The method can also include comparing the first indication and the second indication. The method can further include proceeding with setting up the communication of the data based on the comparing.

An embodiment may be directed to a method. The method can include storing, at a second network element, a second indication of a second configuration previously allocated to a user equipment. The method can also include receiving, at the second network element from a first network element, a resume request to set up communication context for the data transmission from the user equipment. The method can further include sending, from the second network element to the first network element, the stored second indication. The second indication can be configured to permit comparison at the first network element to a first indication of a first configuration in use by the user equipment.

An embodiment may be directed to an apparatus. The apparatus can include means for receiving, at a first network element, data in a transmission from a user equipment. The apparatus can also include means for storing a first indication of a first configuration used by the user equipment to perform the transmission. The apparatus can further include means for sending, to a second network element, a resume request to set up communication context for the data transmission. The apparatus can additionally include means for receiving, from the second network element, a second indication of a second configuration previously allocated to the user equipment. The apparatus can also include means for comparing the first indication and the second indication. The apparatus can further include means for proceeding with setting up the communication of the data based on the comparing.

An embodiment may be directed to an apparatus. The apparatus can include means for storing, at a second network element, a second indication of a second configuration previously allocated to a user equipment. The apparatus can also include means for receiving, at the second network element from a first network element, a resume request to set up communication context for the data transmission from the user equipment. The apparatus can further include means for sending, from the second network element to the first network element, the stored second indication. The second indication can be configured to permit comparison at the first network element to a first indication of a first configuration in use by the user equipment.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing configured grant small data transmission reconfiguration without user equipment context in a distributed unit, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to a small data transmission (SDT) feature. There may be value in supporting new radio (NR) small data transmissions. Small and infrequent data traffic that would benefit from an SDT procedure include both smartphone applications and non-smartphone applications. The smartphone applications may include, for example, traffic from instant messaging (IM) services, heartbeat/keep-alive traffic from IM/e-mail clients and other applications, and push notifications from various applications. Non-smartphone applications may include, for example, periodic positioning information or other traffic from wearables, industrial wireless sensor networks transmitting temperature and/or pressure readings periodically or in an event triggered manner, smart meters and smart meter networks sending periodic meter readings, and other sensor or meter data traffic.

Figure 1:
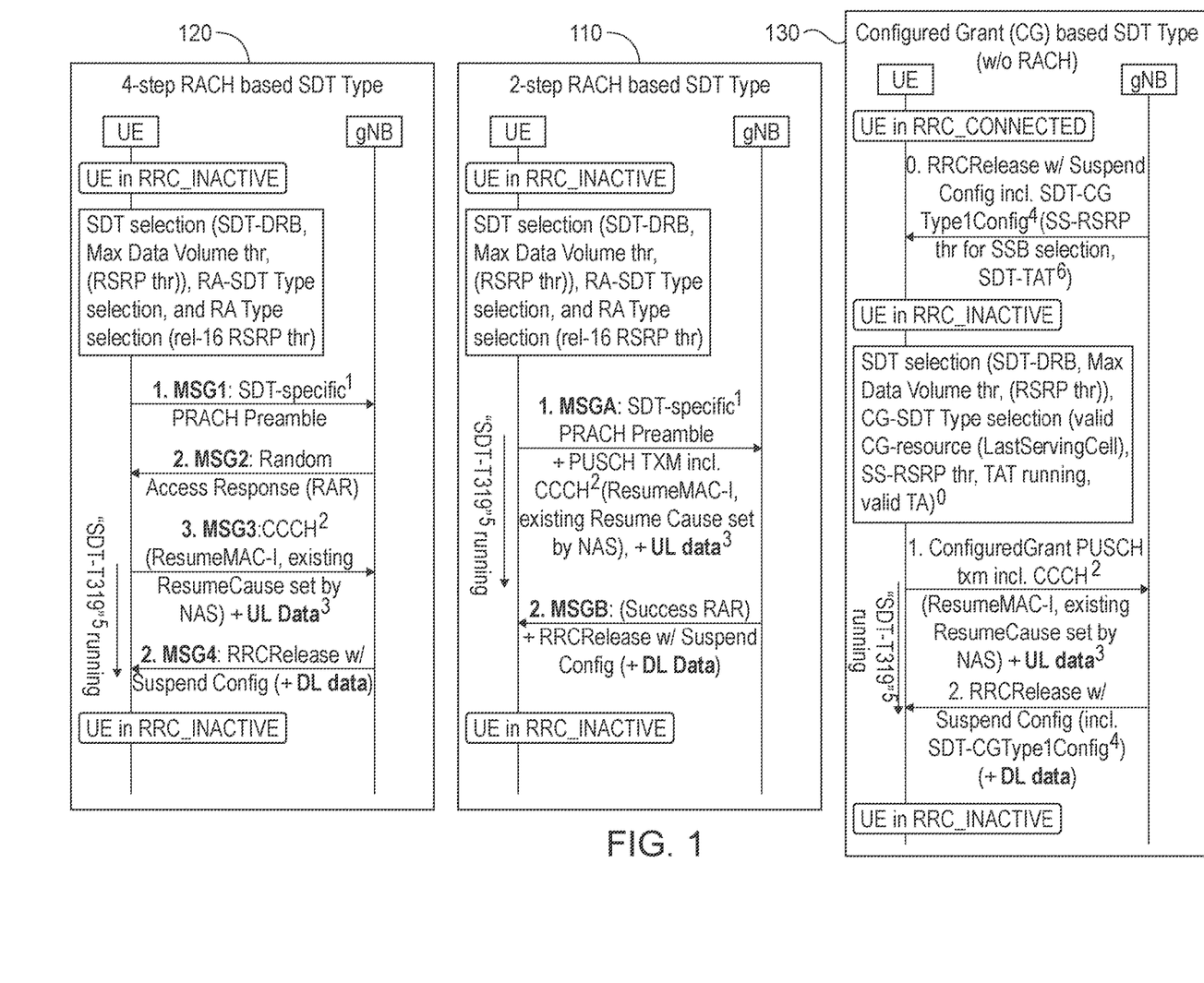
FIG. 1 illustrates three types of small data transmission.

FIG. 1 illustrates three types of small data transmission. At 110, a first type of small data transmission, namely 2-step random access (RA) channel (RACH), "2-step RA SDT," is illustrated. In this approach, the message A (MsgA) of physical uplink shared channel (PUSCH) can be used to transmit the SDT payload.

At 120, a second type of small data transmission, namely 4-step RACH, "4-step RA SDT," is illustrated. In this approach, message 3 (Msg3) of PUSCH can be used to transmit the SDT payload.

At 130, a third type of small data transmission, namely uplink (UL) data on pre-configured PUSCH resources, configured grand small data transmission ("CG-SDT"), is illustrated. In this approach, configured grant type 1 based PUSCH resources can be used by the UE to transmit the SDT payload when it has a valid timing advance (TA) and other conditions are met, without a random access procedure.

Figure 2:
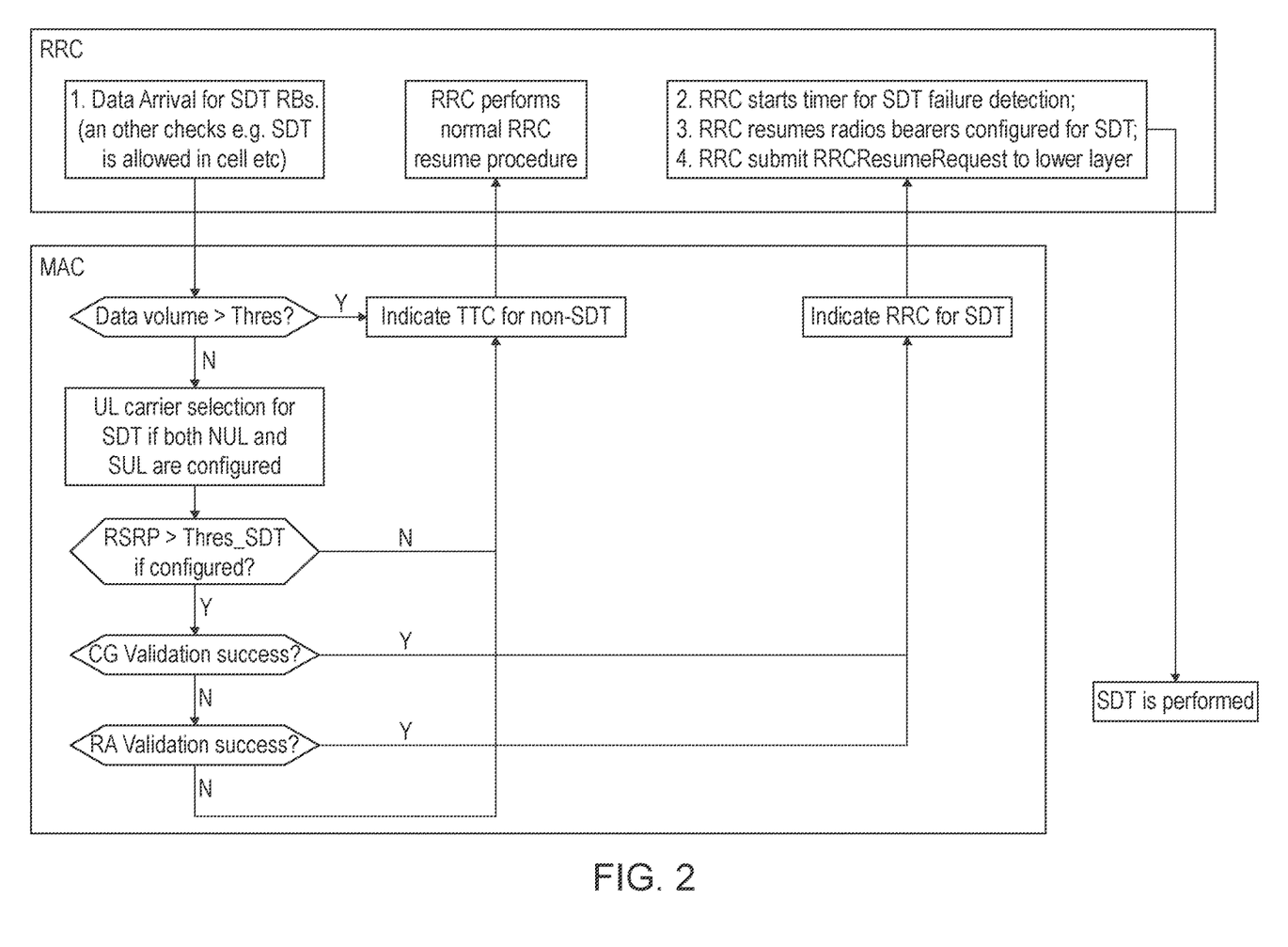
FIG. 2 illustrates a small data transmission decision tree.

FIG. 2 illustrates a small data transmission decision tree. As shown in FIG. 2, a small data transmission decision tree can include aspects at both a radio resource control (RRC) layer and a medium access control (MAC) layer. The selection of SDT as opposed to non-SDT, as well as the selection of SDT type, for example CG-SDT or RA-SDT including 2-step and 4-step RA-SDT, can occur based on a decision tree as shown for example in FIG. 2.

As shown in FIG. 2, at 1, data can arrive for SDT resource blocks (RBs). The MAC layer can determine whether data value of the arriving data exceeds a threshold. If so, the MAC layer can indicate to the RRC layer that the data is for non-SDT, and the RRC layer can perform normal RRC resume procedures ultimately leading to the data being transmitted non-SDT.

Otherwise, the MAC layer can perform carrier selection for SDT, if both normal UL (NUL) and supplementary UL (SUL) are configured.

Then, the MAC layer can determine whether a reference signal received power (RSRP) exceeds a threshold for SDT, if such a threshold is configured. In case, the threshold is configured and is not exceeded, then the MAC layer can indicate to the RRC layer that non-SDT is to be used.

If the threshold is exceeded or is not configured, then the MAC may next determine whether configured grant validations is successful. If so, the MAC layer can indicate to the RRC layer that SDT is to be used.

If CG validation is not successful, the MAC layer can further determine whether random access validation is successful. If so, then the MAC layer can indicate to the RRC layer that SDT is to be used. Otherwise, the MAC layer can indicate to the RRC layer that non-SDT is to be used.

When the MAC layer indicates to the RRC layer that SDT is to be used, at 2, the RRC can start a timer for SDT failure detection. At 3, the RRC can resume radio bearers configured for SDT. Then, at 4, the RRC can submit a RRC resume request to a lower layer. Finally, SDT can be performed at the lower layer.

Figure 3:
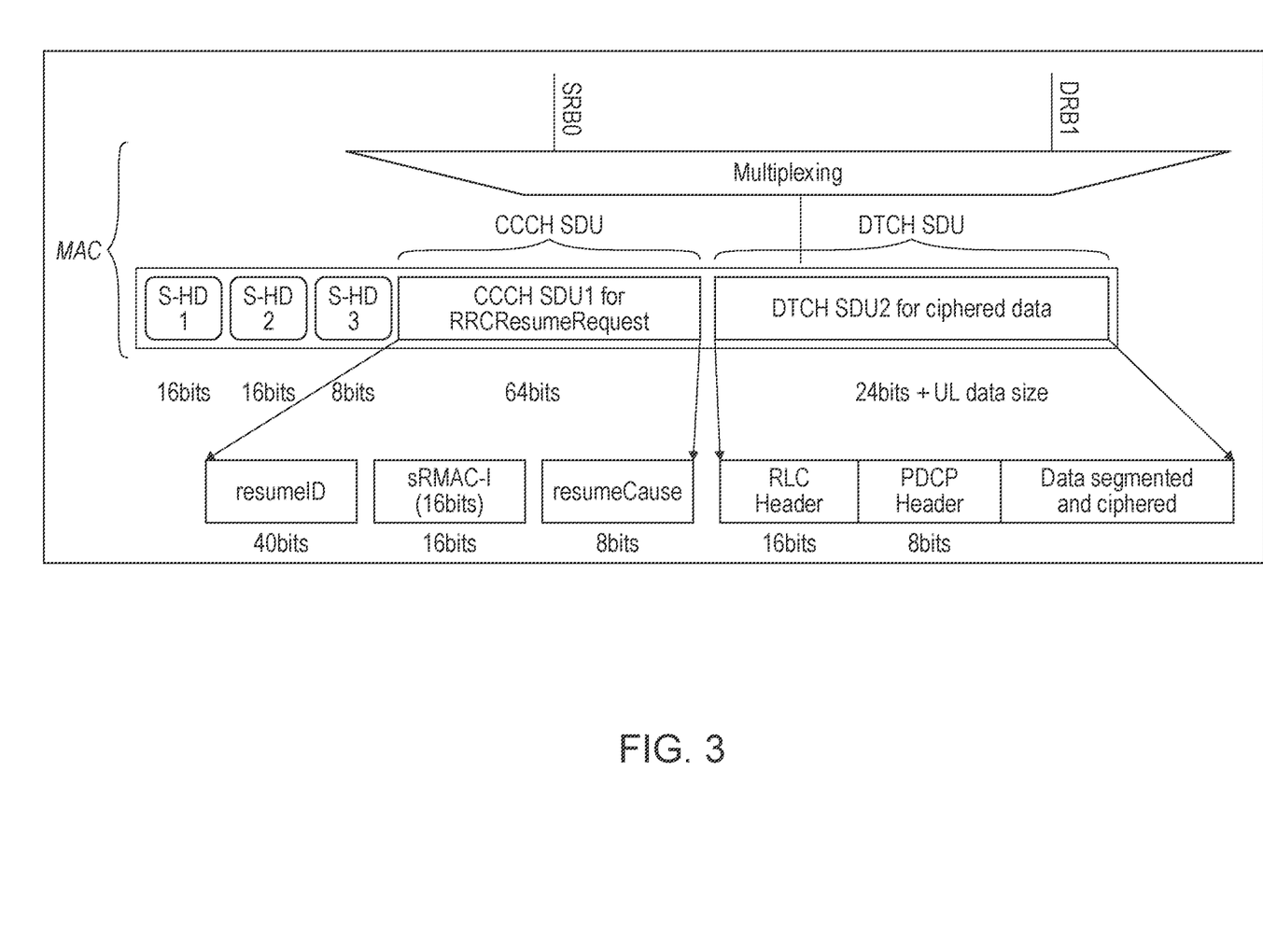
FIG. 3 illustrates an example of an uplink medium access control protocol data unit.

In FIG. 1, an RRC-based approach can be assumed. This approach can entail that the UE sends an RRC message including information about the UE identity and its authentication token, for example message authentication code—integrity (MAC-I). As mentioned in FIG. 2, an RRC Resume Request message can be used for such a purpose. FIG. 3 illustrates an example of an uplink medium access control protocol data unit.

More particularly, FIG. 3 illustrates content of an UL MAC PDU for SDT Msg3/MsgA or CG-based SDT transmission for an example of an RRC-based method. As shown in FIG. 3, the PDU can include a common control channel (CCCH) service data unit (SDU) and a dedicated traffic channel (DTCH) SDU.

The CCCH SDU can include an RRC resume request including the MAC-I. The DTCH SDU can include ciphered data, including a radio link control (RLC) header, a packet data convergence protocol (PDCP) header, and the data itself. As illustrated, the data can comprise multiplexed signaling radio bearer (SRB) 0 data and dedicated radio bearer (DRB) 1 data. The specifics of the UL MAC PDU shown in FIG. 3 are merely for illustration, and not limitation.

Certain embodiments relate to a CG-SDT (configured grant) approach as distinct from an RA-SDT (random access) approach. In certain approaches, a CG-SDT configuration can be allocated and valid in a last serving cell, namely in the cell in which the UE went from active to inactive, and the CG-SDT configuration can be released in the UE upon cell change.

In a disaggregated radio access network (RAN) architecture, there may be a shared responsibility between the DU and the centralized unit (CU)-control plane (CP) in assigning a CG-SDT resource configuration to the UE, because the configuration may depends on multiple aspects. For example, DU may be aware of lower layer aspects of such configuration (such as which beams are to be included in the configuration and the radio quality for the UE), whereas the CU-CP may be aware of aspects such as the traffic characteristics of the UE. For the CU-CP may aware of traffic characteristics that are relevant to define, for example, payload size and resource periodicity of the configuration. The DU can provide the DU's configuration as an RRC container, for example CellGroupConfig, to the CU-CP and the CU-CP can encode the final CG-SDT RRC configuration for the UE.

Figure 4:
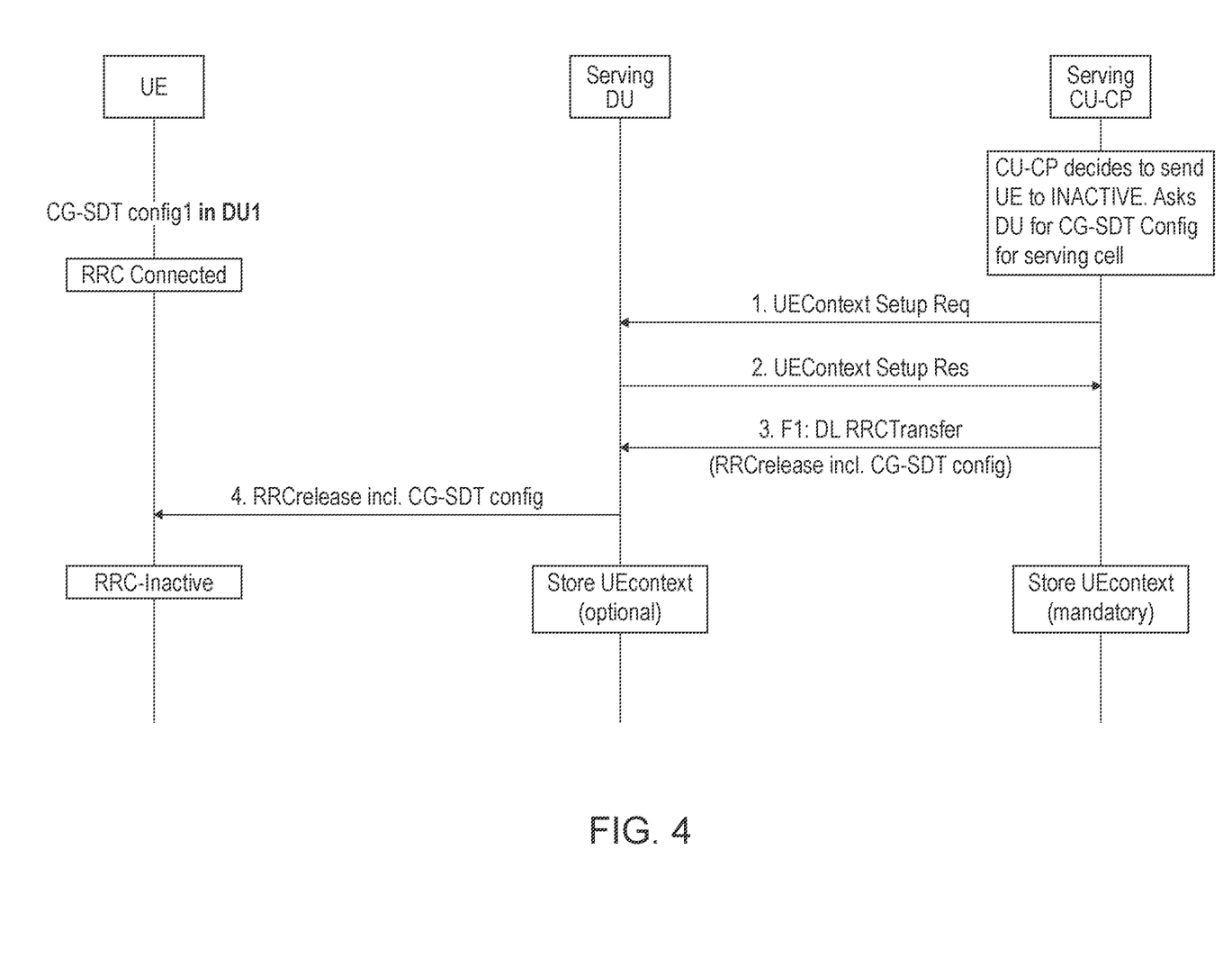
FIG. 4 illustrates configured grant small data transmission configuration for a user equipment in connected mode.

FIG. 4 illustrates configured grant small data transmission configuration for a user equipment in connected mode. The designations "optional" and "mandatory" in FIG. 4 are only for the example approach illustrated in FIG. 4 and do not limit the scope of the disclosure.

In the example of FIG. 4, the serving CU-CP always stores the UE context while the UE is in RRC inactive. However, in the approach illustrated by FIG. 4, the last serving DU may omit storing any context for the UE in RRC inactive.

Certain embodiments are related to a case where it can be assumed that no UE context is stored in the DU, whether or not the UE context is actually stored in the DU. Certain embodiments may be particularly beneficial in cases where UE context is not stored in the DU, regardless of whether the UE context is not stored because storage is optional (as illustrated in the example of FIG. 4), or whether the UE context is not stored because storage is prohibited. Nevertheless, certain embodiments may be applied in cases where it is incorrectly assumed that the UE context is not stored.

One way for the CU CP to determine when a UE did not use the UE's allocated CG SDT configuration may be when the UE initiates the next SDT procedure via a new cell. In such a case, the CU CP may receive the Cell ID in the F1 initial UL Message Transfer message. However, the CU CP may be unable to detect when a UE did not use its allocated CG SDT configuration when the UE initiates the next SDT procedure via the last serving cell. This lack of detection may be because the CU CP may lack visibility as to which L1 resources the UE used during the initiation, which method was used (for example, CG SDT transmission or RACH-based SDT transmission, which SSB beam was used, or the like). Therefore, in such approaches when the UE did not use the UE's previously allocated CG SDT configuration in the serving cell, the CU CP cannot determine that the CU CP needs to send to the UE an updated CG SDT configuration for that same serving cell. The CU CP may also be unable to determine that the CU CP may need to request to DU to reserve resources and build this new CG SDT configuration. Change of beam or beam-group may also imply a need for reallocation of CG-SDT resources.

In one approach, a UE may be allocated an updated and suitable new CG SDT configuration because the UE requests it, for example along with a random access channel (RACH) based SDT request. This approach involves signaling, latency, and power consumption for the UE. In certain circumstances, the UE may need to request new CG-SDT resources in the same cell, and this UE request for CG-SDT resources may be sent from UE to CU-CP via DU, which may then trigger a procedure such as the one in FIG. 4. For example, there may be the need in this approach of network signaling between the DU and the DU's controlling CU-CP, which can be involved in the procedure as follows and as shown in FIG. 4. If the CU-CP decides to assign a CG-SDT configuration, at 1 and 2 in FIG. 4, the CU-CP can request the DU to create and provide to CU-CP a CG-SDT configuration for the UE. Then, at 3 and 4 in FIG. 4, the CU-CP can send to the UE the CG-SDT configuration via the DU.

Certain embodiments provide a method for a DU to determine whether and how to assign a CG-SDT configuration for the UE in RRC inactive, when the DU does not store any UE context. More precisely, certain embodiments may allow a DU, not storing any UE context between two SDT procedures, to detect immediately when a UE configured with a CG-SDT configuration for a cell has not used the CG-SDT configuration when accessing the cell, because this CG-SDT configuration needs an update. Certain embodiments may also allow the DU to send this updated CG-SDT configuration to the CU CP as soon as possible.

Figure 5A:
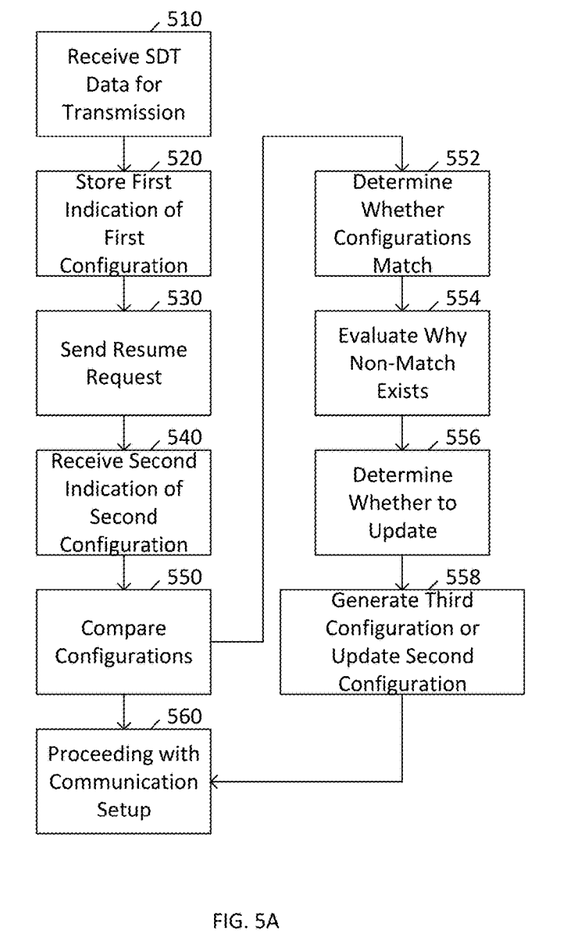
FIG. 5A illustrates a method according to certain embodiments.
Figure 5B:
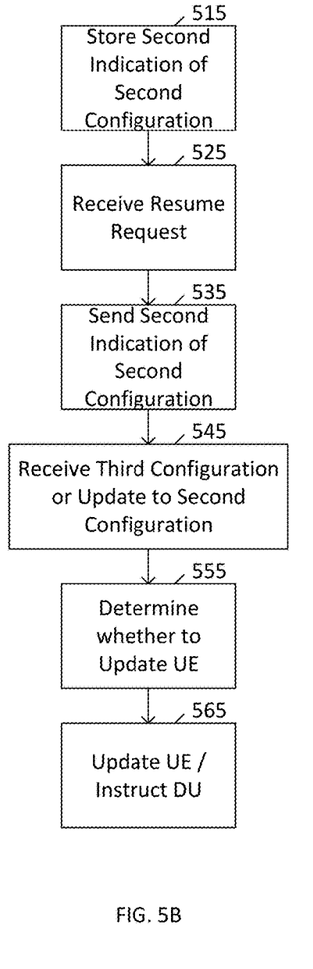
FIG. 5B illustrates a further method according to certain embodiments.

FIG. 5A illustrates a method according to certain embodiments. FIG. 5B illustrates a further method according to certain embodiments. The method of FIGS. 5A and 5B may be usable separately or in combination with one another. For example, the method of FIG. 5A may be a method performed by a distributed unit and method of FIG. 5B may be a corresponding method performed by a centralized unit associated with the distributed unit.

As shown in FIG. 5A, at 510, the method can include receiving, at a first network element, data in a transmission from a user equipment. This data may be SDT data. Accordingly, the data can include a small data transmission in radio resource control inactive state. The first network element can be a distributed unit.

The method can also include, at 520, storing a first indication of a first configuration used by the user equipment to perform the transmission. This storage can be temporary and for purposes of comparison, discussed below, as a serving DU may not need to store any UE context of an RRC inactive UE, assigned with the CG-SDT configuration, between different SDT procedures.

Thus, upon receiving an SDT transmission from the UE at 510, at 520 the DU may newly store the L1/L2 resources used by the UE for the transmission, including (for example) whether the UE used CG-SDT and through which resources: SSB beam, PUSCH resources. The stored information may also be whether the UE used RACH-SDT or legacy resume. Then, at 530, the DU can send the RRC Resume Request to the CU-CP, for example via F1 Initial UL RRC transfer message.

The information storage at 520 can correspond to the incoming SDT request and I-RNTI may be used as UE context identifier.

As mentioned above, the method can further include, at 530, sending, to a second network element, a resume request to set up communication of the data, for example to set up communication context for the data transmission. The second network element can be a centralized unit, for example, the centralized unit for the distributed unit. This can be the centralized unit control plane entity.

The method can additionally include, at 540, receiving, from the second network element, a second indication of a second configuration previously allocated to the user equipment. This indication can be or indicate stored configuration information, as shown at 515 in FIG. 5B, at a serving CU-CP even between different SDT procedures. The serving CU-CP can store both the UE context and the CG-SDT configuration assigned to the UE for use in RRC Inactive mode. This information can be included in CG-Config1.

In one alternative, the second indication can be an identification of a beam or of a beam group. For example, whenever CG-SDT resources are allocated in the gNB-DU to a UE (for example, CG-Config1), the gNB-DU may indicate explicitly the beam or beam-group ID (SSB) configured with CG-resources to the CU-CP (F1: UE Context Setup Response). The CU-CP may store this beam level information in its UE context of an RRC inactive UE, rather than the entire CG-config1. Subsequently when the UE performs SDT in the same cell, the CU-CP may provide the beam or beam-group identifier to the DU to enable determination of whether or not the CG-SDT resources need re-allocation with respect to the beams, for example unused resources in the same beam-group may indicate that no re-allocation of those resources is required.

The second configuration can be the cell group configuration itself (CG-config 1) containing the configured grant configuration.

As shown in FIG. 5A, the method can also include, at 550, comparing the first indication and the second indication.

The method can further include, at 560, proceeding with setting up the communication of the data based on the comparing.

The method can also include, at 552, determining, based on the comparing, whether the first configuration matches the second configuration.

The method can also include, at 554, evaluating, when it is determined that the first configuration does not match the second configuration, why the first configuration does not match the second configuration. For example, based on the comparison at 550 between the stored L1/L2 resources used by the UE for the transmission when accessing against the received CG-Config1, the DU can assess whether the configured grant configuration in CG-Config1 was used by the UE for the transmission and if not why not. For example, the UE may have performed RA-SDT in the same cell and used an SSB beam not part of CG-Config1, for example not assigned with CG-SDT resources, or a timing advance timer (TAT) may have expired.

The method can also include, at 556, determining whether a third configuration, which may be a new configuration or an update to the second configuration, is needed. For example, based on the comparison at 550 and the evaluation at 554, the DU at 556 can newly determine whether the current configured grant configuration in CG-Config1 needs any update or not. If DU assesses that an updated CG-Config2 needs to be built for the UE, the DU can build the updated CG-Config2 and can newly piggybacks the updated configuration in an F1 UE context setup response at 558. Thus, the method can include deciding, when it is determined that the first configuration does not match the second configuration, to build an updated third configuration or an update to the second configuration to be allocated to the UE taking into account at least one element of the first configuration. The method can also include sending the third configuration or an update to the second configuration to the second network element.

CG-Config2 can be built up by, for example, adding CG-PUSCH resources to the SSB beam used by the UE for the transmission, in addition to CG-Config1. In certain embodiments, a change or delta part of CG-Config2 compared to CG-Config1 can be provided by the DU to the CU-CP, rather than providing the entire CG-Config2.

Thus, the method can also include, at 558, updating the second configuration when needed. The updating can involve including an update to the second configuration in a context setup response to the second network element in the setting up the communication of the data.

It is noted that FIG. 5A is provided as one example embodiment of a method or process. However, certain embodiments are not limited to this example, and further examples are possible as discussed elsewhere herein.

FIG. 5B illustrates a further method according to certain embodiments. As shown in FIG. 5B, the method can include, at 515, storing, at a second network element, a second indication of a second configuration previously allocated to a user equipment. This can the same second network element, second indication and second indication discussed above with reference to FIG. 5A.

As further shown in FIG. 5B, the method can include, at 525, receiving, at the second network element from a first network element, a resume request to set up communication context for the data transmission from the user equipment.

The method can further include, at 535, sending, from the second network element to the first network element, the stored second indication. The second indication can be configured to permit comparison at the first network element to a first indication of a first configuration in use by the user equipment, such as the comparison at 550 in FIG. 5A.

More particularly, at 535, the CU-CP can send an F1 UE context setup request message to the DU newly including the stored CG-Config1, previously allocated to the UE. This may be provided contingent upon the UE performing SDT in the same cell. In another embodiment the stored CG-Config 1 or configured grant configuration is received in an F1 UE Context modification request.

As discussed above, in one alternative the second indication can be an identification of a beam or of a beam group.

The method can also include, at 545, receiving a third configuration, which may be a new configuration or an update to the second configuration, from the first network element. The update to the second configuration can be received in a context setup response to the second network element in the setting up the communication of the data. In another embodiment, the stored CG-Config 1 or configured grant configuration can be received in an F1 UE Context modification response. The third configuration or the update of the second configuration can be received from the first network element as a reply message to the sending of the stored second indication to the first network element in the setting up the communication of the data.

It may be the responsibility of the CU-CP then to decide at 555 whether to send CG-Config2 to the UE. In such a case where it is determined that the UE should be updated with CG-Config2, the CU-CP can also, at 565, update the UE and can send an activation indication of CG-Config2 to DU, for the DU to reserve the associated resources.

It is noted that FIG. 5B is provided as one example embodiment of a method or process. However, certain embodiments are not limited to this example, and further examples are possible as discussed elsewhere herein.

Figure 6:
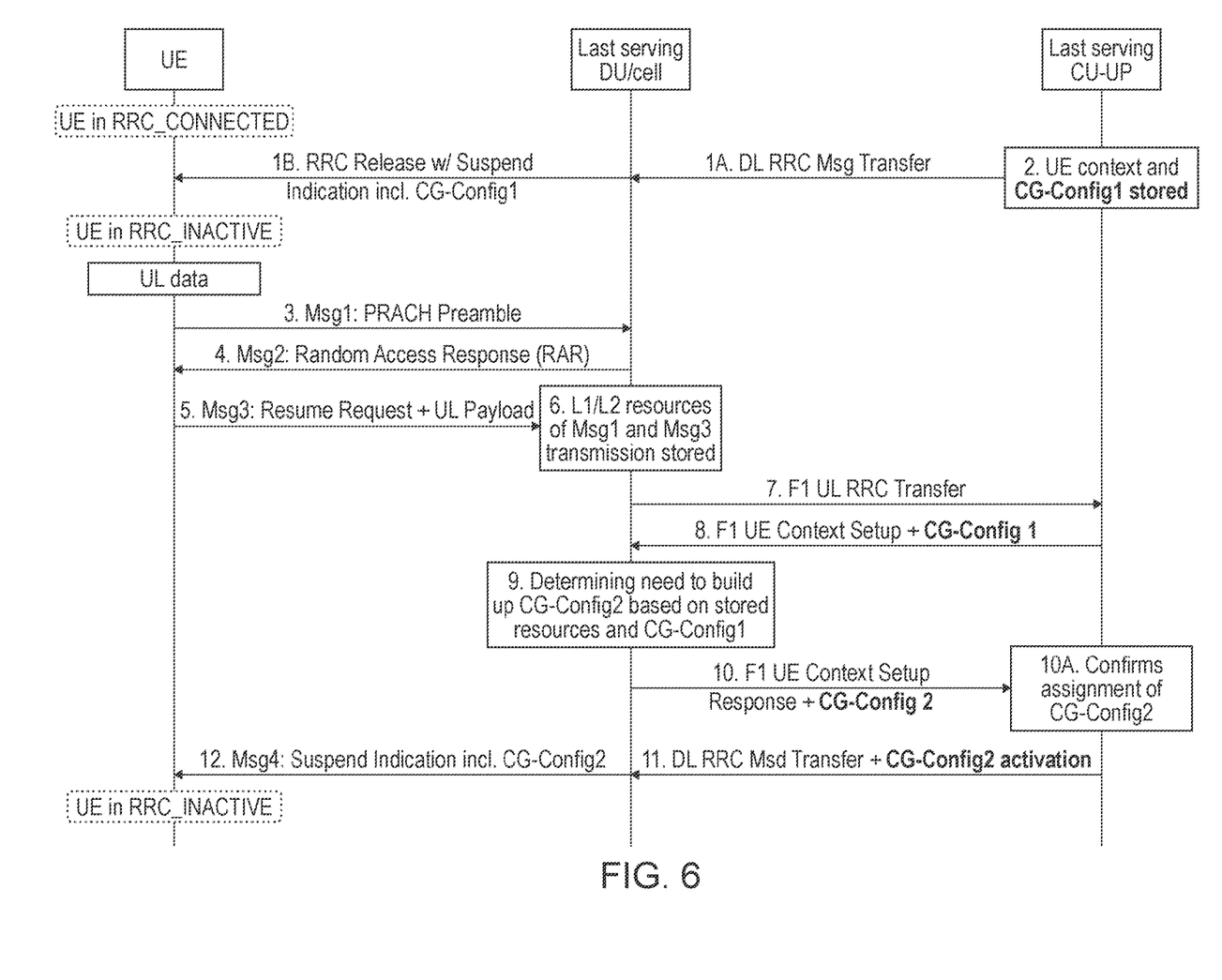
FIG. 6 illustrates a signaling flow of a method according to certain embodiments.

FIG. 6 illustrates a signaling flow of a method according to certain embodiments. The signaling flow in FIG. 6 may correspond to and may implement the methods shown in FIGS. 5A and 5B, and described above. At 1-2 in FIG. 6, the CU CP can send a CG SDT configuration to the UE for a cell 1, this configuration can be referred to for convenience as CG Config 1. CU CP can newly store this CG Config 1 (this can correspond to 515 in FIG. 5B.

As further shown in FIG. 6, at 3, 4, and 5, even though UE may have had a CG SDT configuration for cell 1, the UE may initiate an SDT transmission using RACH-based SDT, because at least one validity condition of CG-SDT may not be fulfilled. For example, the condition may be TA validation, SS-RSRP condition, or CG resources. The Msg3 at 5 in FIG. 6 may correspond to the resume request at 530 in FIG. 5A and 525 in FIG. 5B.

As also shown in FIG. 6, at 6 the DU can newly store the conditions with which UE accessed. The stored conditions can include RACH-based SDT, beam, PUSCH resources, and the like. This storage can correspond to the storage at 520 in FIG. 5A.

At 7 and 8 in FIG. 6, upon receiving an RRC message of the SDT transmission in the F1 UL RRC Message Transfer message, the CU CP can send back an F1 UE Context Setup Request message newly including the previously allocated CG-config 1. The F1 UE Context Setup Request message can provide the second identification of second configuration shown at 540 in FIG. 5A and at 535 in FIG. 5B.

At 9, in FIG. 6, upon receiving the CG config 1 in the F1 UE Context Setup Request message, the DU can newly compare CG config 1 with the conditions stored at 6 and can detect that the UE did not access using the allocated config 1. The DU can also infer one or more reasons why this discrepancy exists. For example, the UE may have accessed with a SSB beam different than the one for which the CG config 1 was built. The comparison and evaluation processes at 9 can correspond to 550, 552, and 554 in FIG. 5A. As a result of the comparison and evaluation, the DU can newly build a CG-config 2, which can be updated to the new accessing conditions of the UE. For example, the building can include adding a CG SDT configuration suitable for the new beam. DU can newly send this updated CG SDT configuration (for example, as CGconfig 2) to the CU CP. This sending the updated CG SDT configuration can correspond to 558 in FIG. 5A.

At 10, 11, and 12 in FIG. 6, at the end of the SDT transaction, if the CU CP decides to send again a CG SDT configuration to the UE to be used for a subsequent SDT procedure, the CU CP can include CG-config 2 in the F1 DL RRC Message Transfer message towards the UE. This inclusion can correspond to 565 in FIG. 5B.

It is noted that FIG. 6 is provided as one example embodiment of a signaling flow. However, certain embodiments are not limited to this example, and further examples are possible as discussed elsewhere herein.

Figure 7A:
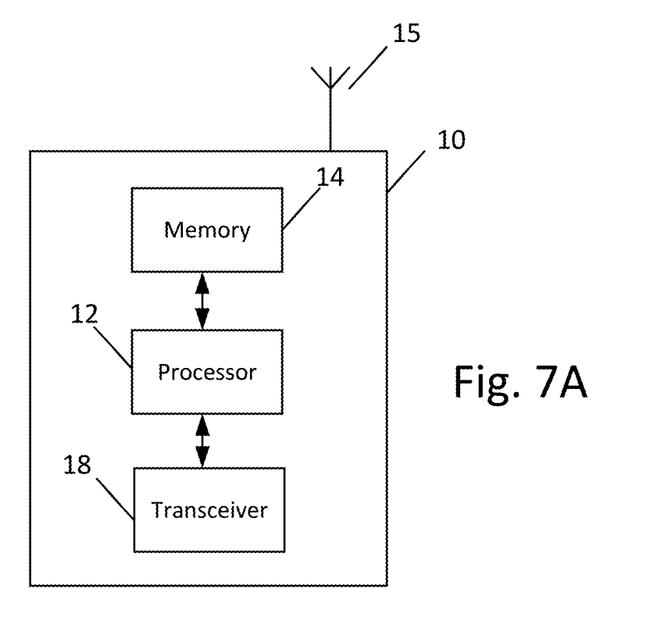
FIG. 7A illustrates an example block diagram of an apparatus, according to an embodiment.

FIG. 7A illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7A.

As illustrated in the example of FIG. 7A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 7A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultra-wideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-6, or any other method described herein. In some embodiments, as discussed herein, apparatus 10 may be configured to perform a procedure relating to providing configured grant small data transmission reconfiguration without user equipment context in a distributed unit, for example.

Figure 7B:
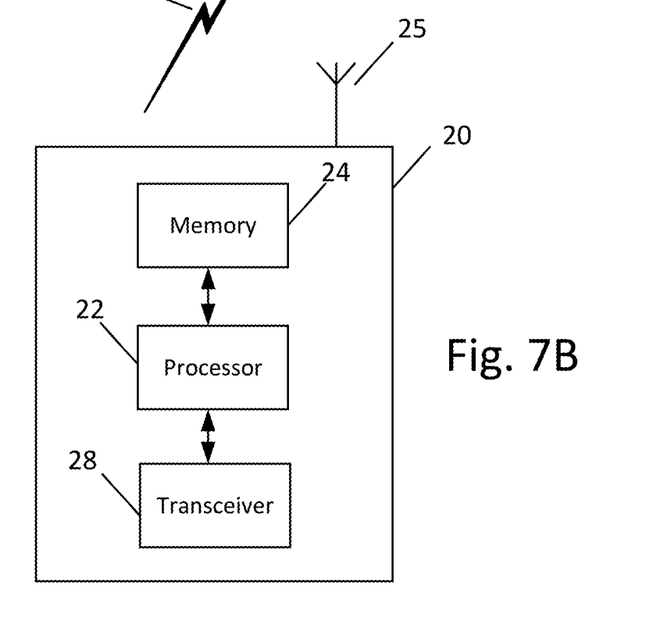
FIG. 7B illustrates an example block diagram of an apparatus, according to an embodiment.

FIG. 7B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7B.

As illustrated in the example of FIG. 7B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-6, or any other method described herein. For example, in an embodiment, apparatus 20 may be controlled to perform a process relating to providing configured grant small data transmission reconfiguration without user equipment context in a distributed unit, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may allow the DU to be responsible for the update of the CG-Config and to receive from the CU-CP the information required for such decision. More precisely, it allows a DU, not storing any UE context between two SDT procedures, to detect immediately when a UE configured with a CG SDT configuration for a cell has not used it when accessing the cell because this CG SDT configuration needs an update. It also allows the DU to then send this updated CG SDT configuration to the CU CP as soon as possible.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

CG Configured Grant
FR1 Frequency Range 1
FR2 Frequency Range 2
EDT Early Data Transmission
MAC-I Message Authentication Code—Integrity
PRACH Physical Random Access Channel
PRB Physical Resource Block
PSS Primary Synchronization Signal
PUR Periodic Uplink Resources
PUSCH Physical Uplink shared channel
RA Random Access
RACH Random Access Channel
RedCap Reduced Capabilities
RNTI Radio Network Temporary Identifier
RO RACH Occasion
RRC Radio Resource Control
RSRP Reference Signal Received Power
SDT Small Data Transmission
SI System Information SIB System Information Block
SSB Synchronization Signal block
SSS Secondary Synchronization Signal
UE User Equipment

What is claimed is:

1. An apparatus, comprising:
   at least one processor; and
   at least one memory including computer program instructions,
   wherein the at least one memory and the computer program instructions are configured to, with the at least one processor, cause the apparatus at least to:
   receive data in a transmission from a user equipment;
   store a first indication of a first configuration used by the user equipment to perform the transmission;
   send, to a network element, a resume request to set up communication context for the data transmission;
   receive, from the network element, a second indication of a second configuration previously allocated to the user equipment;
   compare the first indication and the second indication; and
   proceed with setting up communication of the data based on the comparing.

2. The apparatus of claim 1, wherein the apparatus is further caused to:
   determine, based on the comparing, whether the first configuration matches the second configuration.

3. The apparatus of claim 2, wherein the apparatus is further caused to:
   evaluate, when it is determined that the first configuration does not match the second configuration, why the first configuration does not match the second configuration.

4. The apparatus of claim 3, wherein the evaluating comprises determining that the first indication indicates that the transmission is performed using random access channel-based small data transmission and the second indication indicates a configured grant second configuration.

5. The apparatus of claim 3, wherein the evaluating comprises determining that the first indication indicates that the transmission is performed using a normal resume procedure from radio resource control inactive state for small data transmission and the second indication indicates a configured grant second configuration.

6. The apparatus of claim 2, wherein the apparatus is further caused to:
   when it is determined that the first configuration does not match the second configuration, build a third configuration to be allocated to the user equipment; and
   send the third configuration to the network element.

7. The apparatus of claim 6, wherein the third configuration is built based at least one of the first configuration or the second configuration.

8. The apparatus of claim 1, wherein the first configuration comprises physical resources used by the user equipment to perform the transmission.

9. The apparatus of claim 1, wherein the second configuration comprises a configured grant configuration previously allocated to the user equipment.

10. The apparatus of claim 1, wherein the second indication comprises at least one of: an identification of a beam or of a beam group, or a cell group configured grant configuration.

11. The apparatus of claim 1, wherein the apparatus comprises or is comprised in a distributed unit.

12. The apparatus of claim 1, wherein the network element comprises a centralized unit.

13. The apparatus of claim 1, wherein the data transmission comprises a small data transmission in radio resource control inactive state.

14. A method, comprising:
    receiving, at a first network element, data in a transmission from a user equipment;
    storing a first indication of a first configuration used by the user equipment to perform the transmission;
    sending, to a second network element, a resume request to set up communication context for the data transmission;
    receiving, from the second network element, a second indication of a second configuration previously allocated to the user equipment;
    comparing the first indication and the second indication; and
    proceeding with setting up communication of the data based on the comparing.

15. The method of claim 14, further comprising:
    determining, based on the comparing, whether the first configuration matches the second configuration.

16. The method of claim 15, further comprising:
    when it is determined that the first configuration does not match the second configuration, building a third configuration to be allocated to the user equipment; and
    sending the third configuration to the second network element.

17. The method of claim 14, wherein the first configuration comprises physical resources used by the user equipment to perform the transmission.

18. The method of claim 14, wherein the second configuration comprises a configured grant configuration previously allocated to the user equipment.

19. An apparatus, comprising:
    at least one processor; and
    at least one memory including computer program instructions,
    wherein the at least one memory and the computer program instructions are configured to, with the at least one processor, cause the apparatus at least to:
    store a second indication of a second configuration previously allocated to a user equipment;
    receive, from a network element, a resume request to set up communication context for transmission of data from the user equipment; and
    send, to the network element, the stored second indication,
    wherein the second indication is configured to permit comparison at the network element to a first indication of a first configuration in use by the user equipment.

20. The apparatus of claim 19, wherein the apparatus is further caused to:
    receive a third configuration from the first network element; and
    determine to store and send the third configuration towards the user equipment.

* * * * *